Figure 1:
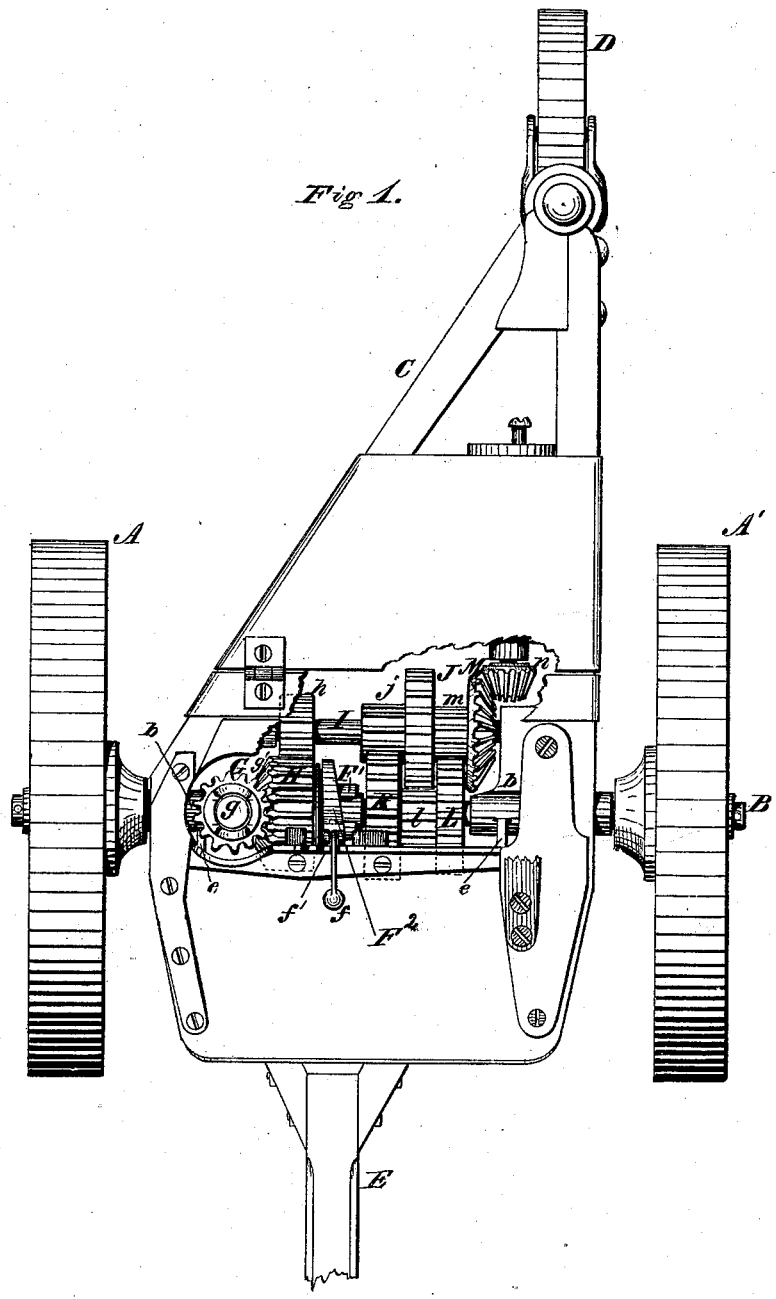

J. P. MANNY.
Harvester.

No. 166,017.

2 Sheets--Sheet 1.

Patented July 27, 1875.

WITNESSES

INVENTOR

J. P. MANNY.
Harvester.
No. 166,017.
2 Sheets--Sheet 2.
Patented July 27, 1875.
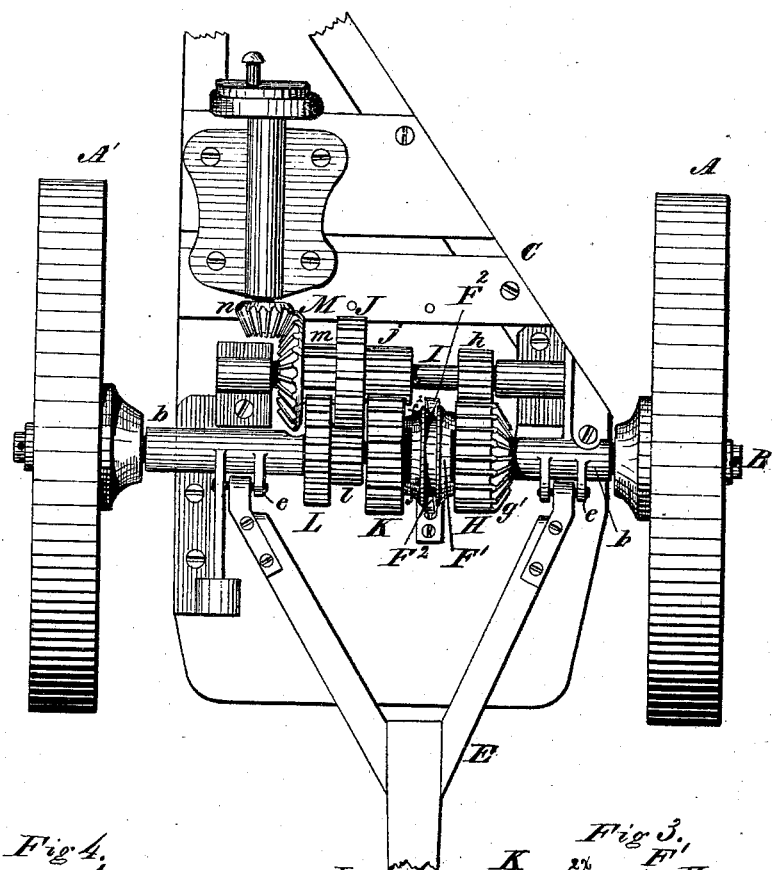
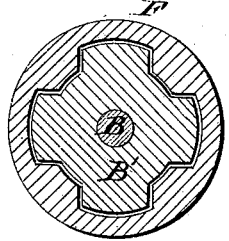
WITNESSES
INVENTOR
By
Attorney

UNITED STATES PATENT OFFICE.

JOHN P. MANNY, OF ROCKFORD, ILLINOIS.

IMPROVEMENT IN HARVESTERS.

Specification forming part of Letters Patent No. 166,017, dated July 27, 1875; application filed November 28, 1874.

*To all whom it may concern:*

Be it known that I, JOHN P. MANNY, of Rockford, in the county of Winnebago and State of Illinois, have invented certain new and useful Improvements in Harvester-Gearing, of which the following is a specification:

My invention relates to harvesters of the class having devices whereby the cutters and rake may simultaneously be thrown into or out of gear, or their speed changed.

The subject claimed is hereinafter specified.

In the accompanying drawings, Figure 1 represents a plan or top view of so much of a harvester embracing my improvements as is necessary to illustrate the subject-matter herein claimed. Fig. 2 represents a view of the under side of the same. Fig. 3 represents a vertical central section of the gearing on the main axle, and Fig. 4 a transverse section through the clutch on the line $xx$ of Fig. 3.

Two main driving and supporting wheels, A A', turn loosely upon an axle, B, with which they are connected by suitable backing-ratchets. The axle turns in suitable pipe-box bearings $b$, secured to a main frame, C, supported at its rear end by a caster-wheel, D. A tongue, E, is hinged to lugs $e$ on the pipe-boxes. Both tongue and frame are thus free to vibrate about the main axle. A clutch, sleeve, or collar, $F^1$, provided with laterally-projecting spurs, is secured upon a cross-shaped hub, B', fastened on the main axle by means of the usual groove and rib, so as to slide freely endwise thereon while compelled to turn therewith, and is controlled by a shipping yoke or lever, $F^2$, which takes into an annular groove on the clutch-collar. A latch, $f$, hinged to this lever takes into any one of three notches in a detent-plate, $f^1$, on the frame. When in the center notch the clutch is held out of gear; when in the outer notches the fast or slow gear, respectively, is thrown into action, as hereinafter described. When straightened or turned into an upright position, this latch forms an extension or handle of the shipping yoke or lever; when turned down, it serves as a latch, as before remarked, thus constituting a simple and effective device.

The rake is driven by means of a bevel-gear, G, mounted on a sleeve turning on a stud-axle, $g$, secured upon one of the pipe-boxes $b$. This bevel-gear meshes with a corresponding wheel, $g'$, forming part of a spur-wheel, H, turning loosely upon the main axle, and capable of engaging with the clutch above mentioned, by which means it is thrown into or out of gear. The spur-wheel H, in turn, engages with a corresponding pinion, $h$, fast on a countershaft, I, mounted in bearings secured to or forming part of the pipe-boxes $b$, being thus capable of vibrating freely on the main axle. A secondary spur-pinion, $j$, secured upon the counter-shaft meshes with a corresponding gear, K, turning loosely on the main axle, and capable of engaging with or disengaging from the clutch above mentioned, in order to vary the speed of the gearing. A spur-pinion, J, secured upon and turning with the countershaft drives a small pinion, $l$, turning loosely on the main axle, with a larger pinion, L, which, in turn, drives a small pinion, $m$, which turns with a bevel-wheel, M, loosely on the counter-shaft. This bevel-wheel drives a corresponding pinion, $n$, on the crank-shaft.

I am thus enabled to use gears of small diameter, my largest gear being only about six and one-half inches in diameter.

The details of the clutch mechanism are shown in Figs. 3 and 4, where the clutch collar or sleeve $F^1$ is shown as formed with laterally-projecting spurs $f^2$ on each face, which slide into corresponding recesses in the contiguous faces of the gears H K.

When geared for a slow motion, as in reaping, the rake is designed to sweep off a gavel for every nineteen feet traversed by the machine. In the slow motion the clutch $F^1$ is thrown into gear with the gear H, as in Fig. 1. This gear drives the pinion $h$ on the counter-shaft, and through it the pinions $j$ J, the pinion $j$ and gear K acting as idle-wheels merely. The pinion J drives the pinions $l$ L, which latter drives the small pinion $m$ and its attached bevel-wheel M. To increase the speed the secondary main gear-wheel K is thrown into gear by the clutch, which is by this act disengaged from the main driving-gear H. The wheel K drives the pinion $j$ on the counter-shaft, the pinion H drives the main gear H and the rake, instead of being driven by it, as before. The pinion J drives the bevel-wheel M through the gears $l$, L, $m$ at an increased speed. The rake now sweeps a gavel every sixteen feet of advance, while the speed of the cutter is correspondingly increased.

It will be noted that all the gears except the one on the crank-shaft are mounted on two parallel shafts; that all the gears are loose on the main axle except the one actually driving at the moment; that the gears on each shaft all revolve in the same direction; but those of one shaft revolve in a direction the opposite of that of the other, and that the change of speed does not vary the direction in which the gears revolve. In the slow motion the rake is driven directly from the main driving-gear, while in the fast motion it is driven from the counter-shaft.

I thus by my invention secure a compact arrangement and steady working of the gearing, with the capacity simultaneously of varying the speed both of the rake and of the cutters.

I do not claim simultaneously changing the speed of the cutters and rake, mechanism for doing this being old.

I claim as of my own invention—

1. The clutch mechanism, hereinbefore described, consisting of the combination of the main axle, the two main gear-wheels H K mounted loosely thereon, and constructed with recesses for the reception of the clutch, the cross-shaped hub fast on the main axle, between the gears H K, the grooved clutch-sleeve or collar F¹, constructed as described, with spurs to enter the recesses in the gears, turning with but moving endwise on the hub, and the oscillating shipping-yoke F²—all constructed as and for the purpose set forth.

2. The combination of the main axle, the spurred sliding clutch-collar F¹ thereon, the loose recessed main gear H, the bevel-wheel $g'$ thereon, the stud-axle on the pipe-box, and the bevel-gear thereon for driving an automatic rake, these members being constructed and operating substantially as set forth.

3. The combination of the main axle, the sliding clutch thereon, the main gear-wheel K, the counter-shaft, the spur-pinion $j$ thereon, gearing with the gear-wheel K, the pinion $h$ fast on the counter-shaft, the main gear H loose on the axle, the bevel-wheel $g'$ thereon, and the bevel rake-gear on the stud-axle $g$, all these members being constructed and operating in combination, substantially as set forth, to drive the rake at an increased speed.

4. The combination of the main axle, the sliding clutch thereon, the spur-wheel H loose on the main axle, the spur-pinion $h$ fast on the counter-shaft, the pinion J on the counter-shaft, the pinions $l$ L loose on the main axle, the spur-pinion $m$ and bevel-wheel M on the counter-shaft, and the pinion $n$ on the crank-shaft, all these members being constructed and operating in combination, substantially as set forth.

5. The combination of the main axle, the main gear-wheels H K loose thereon, the interposed sliding clutch, the bevel-gears $g'$ and G, the counter-shaft, the gears $h\,j$ J fast thereon, the gears $l$ L loose on the main axle, the gears $m$ M loose on the counter-shaft, and the gear on the crank-shaft, these members being constructed and operating in combination, substantially as hereinbefore set forth, whereby the speed both of the rake and of the cutters simultaneously may be varied.

6. The combination of the main axle, the hub B' thereon, the spurred clutch-sleeve F¹ moving endwise thereon, its shipping-yoke, the latch $f$ hinged thereto, and the notched plate with which said lever engages to hold the mechanism into and out of gear, these members being constructed and operating substantially as hereinbefore set forth, whereby the latch forms part of the lever which moves the shipping-yoke, and is then turned down to lock it.

In testimony whereof I have hereunto subscribed my name.

JOHN P. MANNY.

Witnesses:
WM. J. PEYTON,
E. C. DAVIDSON.